Dec. 21, 1965  C. HILL  3,224,298
VARIABLE GEARING FOR MOTOR VEHICLES
Filed Aug. 21, 1962  2 Sheets-Sheet 1

Inventor
CLAUDE HILL
By Mason, Fenwick & Lawrence
Attorneys

Dec. 21, 1965  C. HILL  3,224,298
VARIABLE GEARING FOR MOTOR VEHICLES
Filed Aug. 21, 1962  2 Sheets-Sheet 2

INVENTOR
CLAUDE HILL

BY Mason, Fenwick & Lawrence
ATTORNEYS

United States Patent Office 3,224,298
Patented Dec. 21, 1965

3,224,298
VARIABLE GEARING FOR MOTOR VEHICLES
Claude Hill, Kenilworth, England, assignor to Harry Ferguson Research Limited, "Abbotswood," Stow-on-the-Wold, England, a British company
Filed Aug. 21, 1962, Ser. No. 218,379
Claims priority, application Great Britain, Aug. 22, 1961, 30,186/61
6 Claims. (Cl. 74—688)

This invention relates to variable speed gearing for motor vehicles and of the type in which an epicyclic gear is interposed between the engine and the input component of a hydro-kinetic torque converter, and the drive through the epicyclic gear and torque converter is transmitted thence through a change speed gear which provides one or more forward ratios, neutral and reverse.

Variable speed gearing of the type stated forms the subject matter of British patent specification No. 601,303 of Piero Mariano Selerni (Count Ciri de Teramala).

More specifically, the present invention relates to variable speed gearing of the type stated in which the epicyclic gear comprises in addition to the engine-driven input component, an output component connected to the impeller of the torque converter to drive it, and a control component connected to the turbine of the converter, the turbine and control component constituting the common output of the epicyclic gear and torque converter, which combine to function as so-called infinitely, or continuously variable speed gearing.

The object of the present invention is to facilitate the operation of the change speed gear in order to avoid the need for interposing between the combined epicyclic gear and torque converter on the one hand and the change speed gear on the other hand the customary pedal-operated friction clutch for the assistance of the driver when engaging forward and reverse gears.

According to the present invention there is provided variable speed gearing for a motor vehicle, said gearing including an epicyclic gear having an input component, and output component, and a control component, said component being adapted to be driven by the vehicle engine, a hydrokinetic torque converter including an impeller and a turbine, the impeller being drivably connected to the output from the epicyclic gear, and the turbine being drivably connected to said control component, the turbine and control component constituting a common output from the torque converter and the epicyclic gear, a change speed gear providing at least one forward ratio, neutral, and reverse, means for braking the impeller, and a one-way free-wheel device through which the drive is transmitted from said common output to said change speed gear, whereby in operation when by the operation of the impeller brake means the impeller speed is reduced relative to the engine speed sufficiently to reverse the turbine by the interaction of the epicyclic components to which the impeller and the turbine are connected, the change speed gear is isolated from torque transmitted through the torque converter to the common output, enabling gears to be freely engaged.

It is desirable that the driver should be enabled to utilise the engine to assist braking of the vehicle by ensuring that the roadwheels have a driving connection with the turbine when the vehicle speed exceeds the engine speed.

Accordingly, there are interposed between the aforesaid common output and the change speed gear a pair of one-way clutch components which effectively interengage when the roadwheel speed exceeds the speed of said output to drive the engine through the combined torque converter and epicyclic gear.

Preferably, the one-way clutch components are under control of the driver in conjunction with the means for braking the impeller.

An embodiment of the invention will now be described by way of example with reference to the accompanying drawings.

Figure 1:
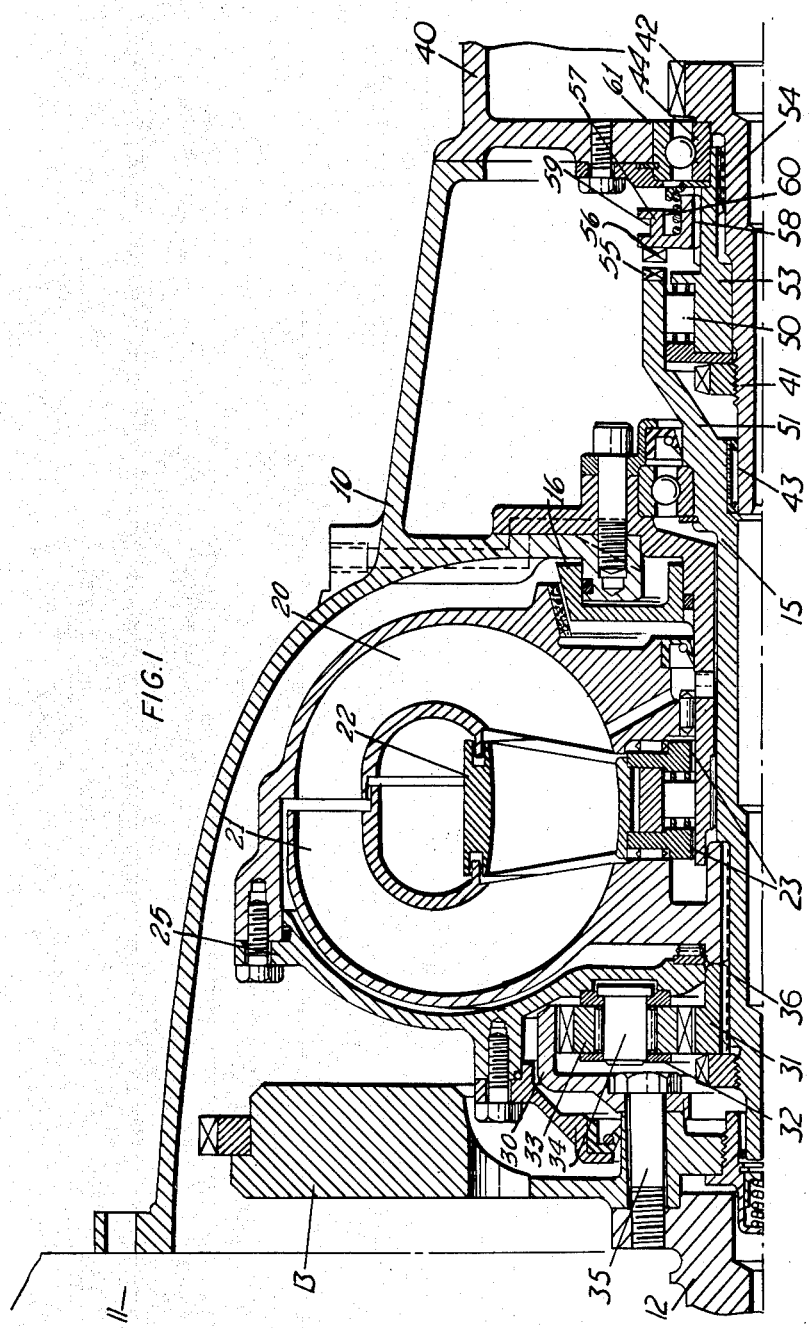
FIGURE 1 is a vertical sectional view of an embodiment of the invention, illustrating a portion of the torque converter, the epicyclic gear train and associate components, and having portions thereof broken away.
Figure 2:
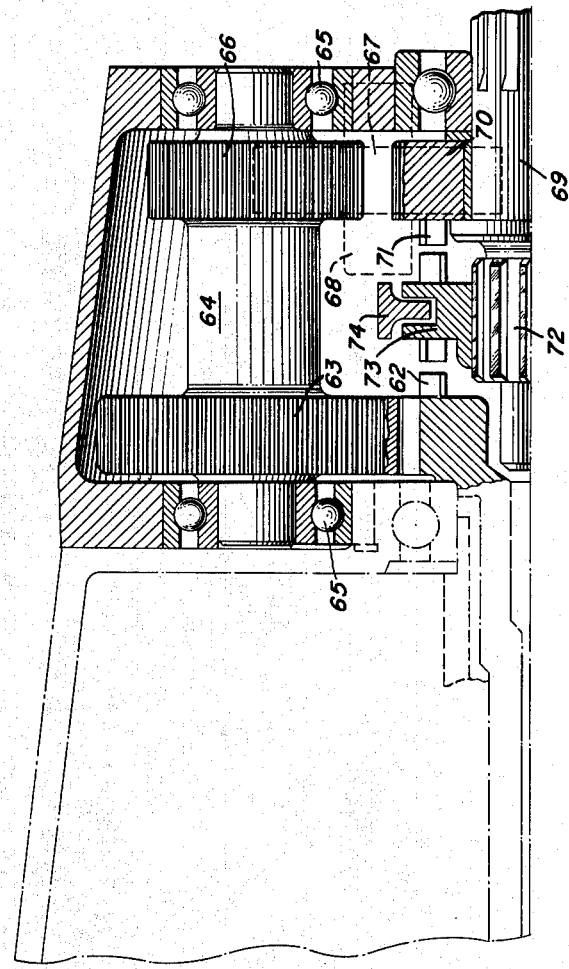
FIGURE 2 is a verical cross-sectional view of the speed change unit or gear box, having portions thereof broken away.

In an example of the combined epicyclic gear and hydro-kinetic torque converter, the working parts are enclosed in a gear case 10 which extends from the crank case 11 of the engine.

The torque converter is conventional, comprising an impeller 20, a turbine 21 and an intervening reaction wheel 22, which is free to rotate in the same direction as the impeller and turbine but is locked against rotation in the opposite direction by one-way free wheel 23. The impeller forms with an end cover 25 the liquid containing casing of the converter. The impeller 20 is connected to a brake member to which a brake 16 on the gear case is applicable by the action of the driver. For instance, there may be provided on the footboard a depressible plunger, or button, which when depressed causes the impeller brake 16 to be applied.

The epicyclic gear comprises an internally toothed annulus 30, a sunwheel 31, a planet-carrier 32 and planet-wheels 33, each journaled on a bearing pin 34 secured to the planet-carrier 32. The annulus 30 is the engine-driven input component, being bolted to the engine crankshaft 12 and flywheel 13 by bolts 35. The planet-carrier 32 is the output component, being secured to the impeller 20, which it drives. The sunwheel 31 is the controlling component of the epicyclic gear.

The turbine 21 of the torque converter and the sunwheel 31 of the epicyclic gear are both connected through splines 36 to an output shaft 15 common to the combined converter and epicyclic gear, which as aforesaid functions as continuously variable gearing.

The output shaft 15 is connected through devices hereinafter described to a gearbox under control of a hand gear lever, there being provision for one or more forward ratios, neutral and reverse. This gearbox and its gear lever may be of conventional construction.

In the drawing, 15 indicates the output shaft, 40 the gear case of the change speed gearbox, 41 the input shaft of the gearbox and 42 a gearwheel of this gearbox. The shaft 41 extends into the hollow interior of the shaft 15 and is supported by an intervening bearing 43. The shaft 41 rotates in a ball-bearing 44 in the gear case 40. Gearwheel 42 has dog teeth 62 formed on one face thereof, and is in constant engagement with a gearwheel 63 formed on a lay shaft 64 of the gearbox. The lay shaft 64 is supported in a bearing 65 in the gearbox casing 40 and has formed thereon another gearwheel 66 which is in constant engagement with a reversing pinion 67 mounted on an auxiliary shaft 68 of the gearbox. The output of the gearbox is a shaft 69 which is coaxial with the input shaft 41 and is carried in the shaft 41. The shaft 69 has an output gear 70 rotatably mounted thereon and, in operation, is adapted to be driven thereby. The output gear 70 has dog teeth 71 on one side thereof; corresponding dog teeth 62 are provided on the input gearwheel 42. The output shaft has a splined portion 72 and slidably mounts thereon a dog clutch member 73 which is axially interposed between the input gear 42 and the output gear 70 and is adapted to be selectively moved backwards and forwards along the shaft 69 to selectively lock the input gearwheel 42 or the output gear 70 to said shaft 69 by means of engagement of dog teeth on the dog clutch member 73 with the respective dog teeth 62, 71 on the input or output gears 42, 70. The dog clutch member 73 is adapted to be moved by a selector mechanism (partially illustrated at 74).

Thus, when the input gearwheel 42 is locked with the shaft 69 the drive takes place "straight through" the gearbox, whereas when the output gear 70 is locked to the output shaft 69 the drive takes place through the lay shaft 64 and auxiliary shaft 68, the output gear 70 and then the shaft 69 providing, by virtue of the auxiliary shaft 68, an output drive in the reverse direction.

One of the devices between the output shaft 15 and the input shaft 41 of the gearbox comprises a free-wheel device 50. This device is accommodated within an outer sleeve 51, which is an extension of the shaft 15, and the device is fitted on an inner sleeve 53 which is splined at 54 to the shaft 41. The arrangement is such that the free-wheel device can transmit torque only in the vehicle-driving direction or rotation from the shaft 15 (which is unidirectional when transmitting engine power) to the shaft 41.

The other of the devices between the shafts 15 and 41 is a one-way clutch consisting of complementary saw-toothed components 55, 56. One of these is integral with the outer sleeve 51. The other saw-toothed component 56 is provided on a collar 57 which is splined at 58 to the inner sleeve 53 so as to be axially slidable along this sleeve. The collar 57 has an annular groove 59 which is engaged by a control fork (not shown) under the control of the driver. The collar is also acted upon by a compression spring 60 seated against a ring 61 which abuts against the ball-bearing 44, the spring continually pressing the collar to move in the direction to engage the component 56 with the component 55. The saw teeth of these components are set to transmit torque only in the return direction, namely from the shaft 41 to the shaft 15.

The driver-controlled fork is shiftable to retract the component 56 clear of the component 55 (as shown in the drawing) against the spring pressure through an operative connection with the same means, instanced hereinbefore as a depressible foot plunger, or button, by which the driver causes the brake to be applied.

Assume that the vehicle is stationary, that the gearbox already is in neutral or has been shifted into neutral, and that the engine has been started. The epicyclic gear components and the torque converter all revolve freely, the output shaft 15 and the gearbox input shaft 41 revolving with them. If it were attempted, under such conditions, to shift the gear lever to first forward ratio or reverse, the reaction of the stationary gearwheel about to be driven would instantly create a torque which would prevent or seriously hinder the requisite intermeshing of the driving and driven teeth; that is to say, the gears would grind. However, the driver depresses the aforesaid plunger, or button, by foot action, the effects of which are firstly to retract the saw-toothed component 56 from engagement with the component 55 (these components being normally inter-engaged under the pressure of the spring 60) and secondly to apply the impeller brake. This causes the impeller-and-planet-carrier unit to slow down relatively to the engine-and-annulus speed sufficiently to constrain the turbine-sunwheel unit to rotate the output shaft 15 very slowly in the reverse direction. Seeing that the free-wheel device 50 is ineffective to transmit driving power in this direction the gearbox is isolated from the engine, epicyclic gear and torque converter and therefore there is no hindrance to gear engaging.

Supposing that when the vehicle is in motion, forward or reverse, the driver desires to slow the vehicle and to do so relieves his foot pressure on the accelerator pedal, with or without application of the foot brakes, so that the vehicle tends to over-run the engine, the device consisting of the saw-toothed components 56, 55 (which as aforesaid are normally inter-engaged) automatically becomes effective to transmit return torque through the shaft 15 (the freewheel device 50 now being ineffective) to the sunwheel-turbine unit and thence through the combined epicyclic gear and torque converter to the engine.

I claim:
1. A transmission comprising a housing, a rotatable input means, a rotatable output means, a rotatable intermediate means disposed between said input and output means and axially aligned therewith, an epicyclic gear train unit including a ring gear, a sun gear and a plurality of planetary gears, a carrier for carrying said planetary gears, a fluid torque converter including an impeller, a turbine and a reaction wheel, the reaction wheel of said converter mounted on a portion of said housing for rotation only in the direction of said impeller and said turbine, the turbine of said converter mounted on said intermediate means for rotation therewith, the impeller of said converter rotatably mounted on a portion of said housing, said planetary gear carrier being mounted for rotation with the impeller of said converter, said sun gear of said epicyclic gear train mounted on said intermediate means for rotation therewith, the ring gear of said epicyclic gear train mounted on said input means for rotation therewith, said transmission including means for braking the impeller of said converter and means for transmitting torque from said intermediate means to said output means only in a forward drive direction.

2. A transmission according to claim 1 having unidirectional clutch means operable for selectively transmitting torque from said intermediate means to said output means.

3. A transmission according to claim 2 having control means for selectively actuating said clutch means.

4. An automotive vehicle including drive means and a speed change unit having a transmission comprising a housing, a rotatable input means operatively connected to said drive means, a rotatable output means operatively connected to said speed change unit, a rotatable intermediate means disposed between said input and output means and axially aligned therewith, an epicyclic gear train unit including a ring gear, a sun gear and a plurality of planetary gears, a carrier for carrying said planetary gears, a fluid torque converter including an impeller, a turbine and a reaction wheel, the reaction wheel of said converter mounted on a portion of said housing for rotation only in the same direction as said impeller and turbine, the turbine of said converter mounted on said intermediate means for rotation therewith, the impeller of said converter rotatably mounted on a portion of said housing, said planetary gear carrier being mounted for rotation with the impeller of said converter, said sun gear of said epicyclic gear train mounted on said intermediate means for rotation therewith, the ring gear of said epicyclic gear train mounted on said input means for rotation therewith, said transmission including means for braking the impeller of said converter and means for transmitting torque from said intermediate means to said output means only in a forward drive direction.

5. A vehicle according to claim 4 having unidirectional clutch means operable for selectively transmitting torque from said intermediate means to said output means.

6. A vehicle according to claim 5 having control means for selectively actuating said clutch means.

References Cited by the Examiner
FOREIGN PATENTS
455,915  10/1936  Great Britain.

DON A. WAITE, *Primary Examiner.*